US011056934B2

United States Patent
Kubota et al.

(10) Patent No.: US 11,056,934 B2
(45) Date of Patent: Jul. 6, 2021

(54) ROTARY ELECTRIC MACHINE WITH A STATOR CORE WITH TEETH HAVING DIFFERENT PROTRUSION PORTIONS HEIGHTS

(71) Applicant: HONDA MOTOR CO., LTD., Tokyo (JP)

(72) Inventors: Yoshihisa Kubota, Wako (JP); Yuta Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 105 days.

(21) Appl. No.: 16/528,971

(22) Filed: Aug. 1, 2019

(65) Prior Publication Data

US 2020/0044499 A1 Feb. 6, 2020

(30) Foreign Application Priority Data

Aug. 6, 2018 (JP) .............................. JP2018-147487

(51) Int. Cl.
 *H02K 1/16* (2006.01)
 *H02K 21/14* (2006.01)
 *H02K 29/03* (2006.01)

(52) U.S. Cl.
 CPC ............ *H02K 1/165* (2013.01); *H02K 21/14* (2013.01); *H02K 29/03* (2013.01); *H02K 2213/03* (2013.01)

(58) Field of Classification Search
 CPC ........... H02K 1/14; H02K 1/146; H02K 1/16; H02K 1/08; H02K 1/06; H02K 15/02;

(Continued)

(56) References Cited

U.S. PATENT DOCUMENTS 1,538,196 A * 5/1925 Livingston ............... H02K 1/16
310/216.102
4,616,151 A * 10/1986 Pryjmak .................. H02K 1/26
310/216.012

(Continued)

FOREIGN PATENT DOCUMENTS

CN 103457365 A 12/2013
CN 206575235 U 10/2017

(Continued)

OTHER PUBLICATIONS

Office Action received in corresponding CN application No. 201910710340.6 dated Oct. 14, 2020 with English translation (17 pages).

(Continued)

*Primary Examiner* — Maged M Almawri
(74) *Attorney, Agent, or Firm* — Rankin, Hill & Clark LLP (57) ABSTRACT

A stator core for a rotary electric machine is provided, which includes core members stacked and formed annularly so as to surround a rotor, each core member including a plurality of slots extending from one end to another end in a shaft direction and teeth formed between the slots. A whole of the teeth includes a first teeth section including, at a tip on an inner periphery side of each core member, each tooth including a first protrusion portion and a second protrusion portion with a lower protrusion height than the first protrusion portion protruding in a circumferential direction of each core member and a second teeth section including a pair of the first protrusion portions and/or a pair of the second protrusion portions.

8 Claims, 7 Drawing Sheets

(58) Field of Classification Search
CPC ............... H02K 15/022; H02K 15/026; H02K 2201/09; H02K 29/03; H02K 21/14; H02K 2213/03; H02K 1/165
USPC .............. 310/216.004–216.097; 29/596, 597
See application file for complete search history.

(56) References Cited

U.S. PATENT DOCUMENTS

| | | | | |
|---|---|---|---|---|
| 4,700,098 A * | 10/1987 | Kawashima | ........... | H02K 29/08 310/156.45 |
| 4,847,526 A * | 7/1989 | Takehara | ............... | H02K 1/146 310/185 |
| 5,107,159 A * | 4/1992 | Kordik | .................. | H02K 1/146 310/156.44 |
| 5,331,245 A * | 7/1994 | Burgbacher | ........... | H02K 29/03 310/186 |
| 5,477,096 A * | 12/1995 | Sakashita | ................ | H02K 1/06 310/216.016 |
| 5,778,703 A * | 7/1998 | Imai | ........................ | D06F 37/40 68/12.02 |
| 5,986,377 A * | 11/1999 | Yamada | ............... | H02K 15/066 310/216.013 |
| 6,242,835 B1 * | 6/2001 | Uemura | ................ | H02K 3/493 310/214 |
| 6,424,073 B1 * | 7/2002 | Kometani | ................ | H02K 1/16 310/179 |
| 6,433,456 B1 * | 8/2002 | Higashino | ................ | H02K 1/16 310/180 |
| 6,774,520 B2 * | 8/2004 | Wauke | ................ | G11B 19/2009 310/156.45 |
| 6,885,127 B1 * | 4/2005 | Higashino | ................ | H02K 1/16 310/179 |
| 6,919,663 B2 * | 7/2005 | Iles-Klumpner | ....... | H02K 1/276 310/156.01 |
| 8,274,182 B2 * | 9/2012 | Nakayama | ............ | H02K 41/03 310/12.25 |
| 8,847,460 B2 * | 9/2014 | Jurkovic | ................ | H02K 21/16 310/216.092 |
| 9,331,530 B2 * | 5/2016 | Jang | ........................ | H02K 1/146 |
| 9,685,264 B2 * | 6/2017 | Neuenschwander | .. | H02K 15/02 |
| 10,476,321 B2 * | 11/2019 | Li | ......................... | H02K 15/022 |
| 2002/0075121 A1 * | 6/2002 | Akita | ..................... | H02K 1/148 336/234 |
| 2002/0163277 A1 * | 11/2002 | Miyake | ................ | H02K 15/022 310/216.001 |
| 2007/0018529 A1 * | 1/2007 | Naitou | .................. | A61G 5/045 310/216.012 |
| 2007/0024148 A1 * | 2/2007 | Maita | ................... | H02K 23/405 310/216.011 |
| 2011/0169369 A1 * | 7/2011 | Liang | .................... | H02K 29/03 310/216.092 |
| 2016/0352159 A1 * | 12/2016 | Li | ......................... | H02K 1/146 |
| 2020/0052532 A1 | 2/2020 | Li et al. | | |

FOREIGN PATENT DOCUMENTS

| | | |
|---|---|---|
| JP | 2003-018802 A | 1/2003 |
| JP | 2014-222958 A | 11/2014 |
| JP | 2017-005980 A | 1/2017 |

OTHER PUBLICATIONS

Office Action received in corresponding JP application No. 2018-147487 dated Jun. 9, 2020 with English translation (8 pages).

* cited by examiner

ROTARY ELECTRIC MACHINE WITH A STATOR CORE WITH TEETH HAVING DIFFERENT PROTRUSION PORTIONS HEIGHTS

BACKGROUND OF THE INVENTION

1. Field of the Invention

The present invention relates to a stator core for a rotary electric machine and the rotary electric machine.

2. Description of the Related Art

As a method for decreasing torque ripple (uneven torque) in conventional rotary electric machines, disclosed is a method including: creating an opening portion in communication with each slot between teeth of a stator core; and making this opening portion tilted with respect to a shaft direction.

SUMMARY OF THE INVENTION

Unfortunately, in the stator core disclosed in Japanese Patent Application Publication No. 2003-18802, sagging portions at a tip of each tooth do not agree in facing direction thereof, so that there is a concern that a gap may present between stacked magnetic steel sheet layers. When such a gap is formed, the space factor for the magnetic steel sheets may become lower and the torque density decreases accordingly. Also, in the stator core disclosed in JP2003-18802, the number of press-punched magnetic steel sheet patterns is increased, which may increase a cost.

The present invention provides a solution to the above previous problems. The purpose of the present invention is to provide a stator core for a rotary electric machine and the rotary electric machine such that while torque ripple is suppressed, production cost can be reduced.

An aspect of the present invention provides a stator core for a rotary electric machine, which includes core members stacked and formed annularly so as to surround a rotor, each core member including a plurality of slots extending from one end to another end in a shaft direction and teeth formed between the slots. A whole of the teeth includes a first teeth section including, at a tip on an inner periphery side of each core member, each tooth including a first protrusion portion and a second protrusion portion with a lower protrusion height than the first protrusion portion protruding in a circumferential direction of each core member and a second teeth section including a pair of the first protrusion portions and/or a pair of the second protrusion portions.

The present invention makes it possible to provide a stator core for a rotary electric machine and the rotary electric machine such that while torque ripple is suppressed, production cost can be reduced.

DETAILED DESCRIPTION OF THE INVENTION

With reference to the appropriate Drawings, the following details each rotary electric machine stator core according to embodiments of the present invention (hereinafter, referred to as a stator core). In addition, the size and shape of each member may be modified or schematically exaggerated for description convenience.

First Embodiment

Figure 1:
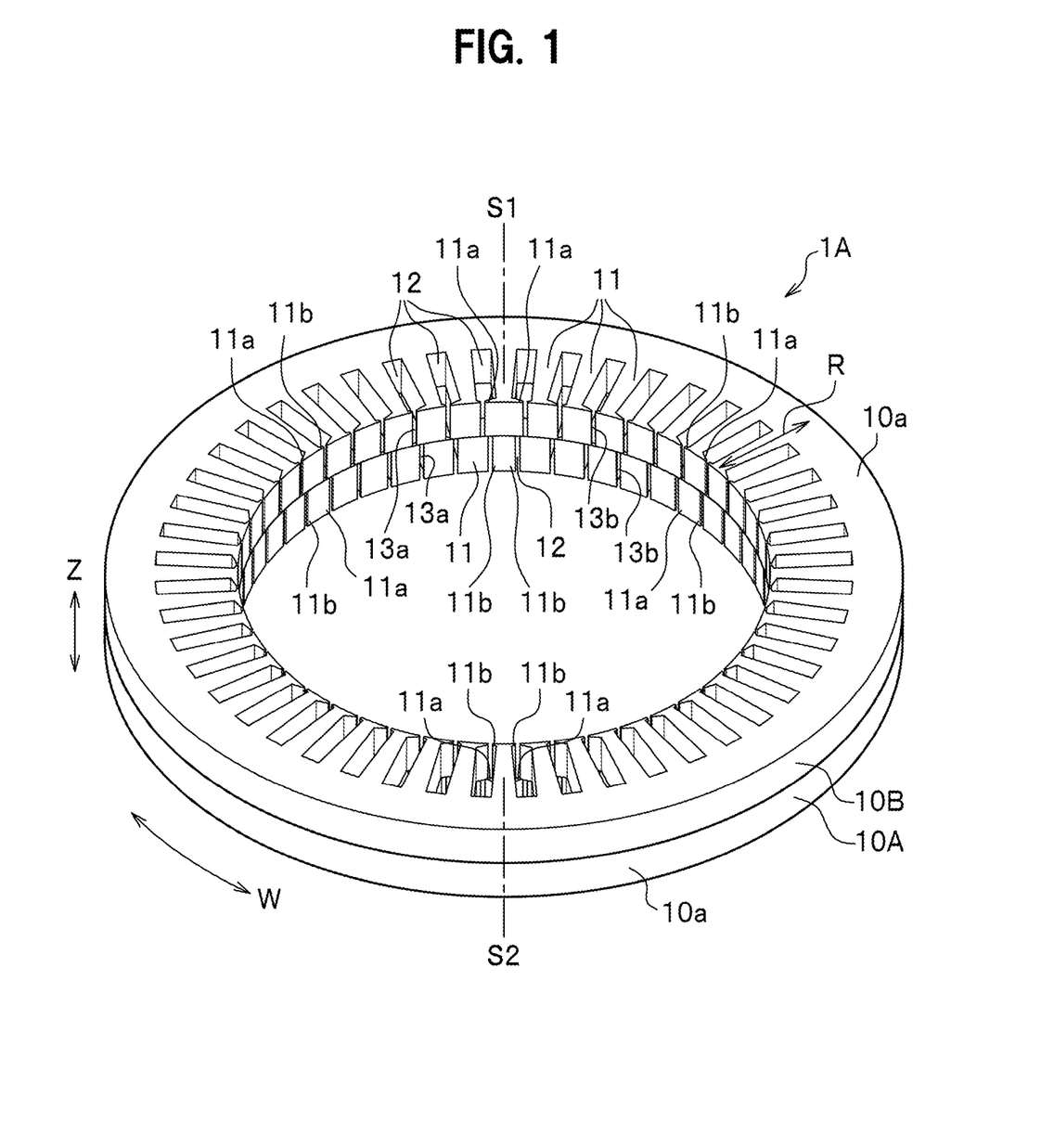
FIG. 1 is a perspective view illustrating a stator core according to a first embodiment.

FIG. 1 is a perspective view illustrating a stator core according to a first embodiment. Note that in the following figures, the "shaft direction" of the stator core is denoted by a sign Z; the "circumferential direction" is denoted by a sign W; and the "radial direction" is denoted by a sign R.

As shown in FIG. 1, the stator core 1A is structured by stacking core members 10A and 10B and has a substantially cylindrical shape. The core members 10A and 10B are each a ring-shaped member produced by layering thin sheets made of material with, for instance, good core loss levels, magnetic flux density, and magnetic permeability. Their external surface is coated with an insulator film. Note that in FIG. 1, the core member 10A is arranged below and the core member 10B is arranged above. But, the arrangement may be opposite.

In the core member 10A, each tooth (stator tooth) 11 and each slot 12 are alternately formed along the W direction. The core member 10B has the same shape as of the core member 10A (which, however, is turned upside down), and each tooth 11 and each slot 12 are alternately formed along the W direction. Note that in FIG. 1, the core member 10A and the core member 10B are each depicted as composed of one thick member. But, the core members 10A and 10B are each structured by layering a plurality of magnetic sheet materials in the Z direction.

Meanwhile, the core member 10A has a cylindrical (ring-shaped) core main body 10a on the outer circumferential side. Teeth 11 protrude inward in the R direction relative to the inner circumferential surface of this core main body 10a. Each tooth 11 is provided with an equal interval in the W direction. In addition, the teeth 11 are formed evenly on the inner circumferential surface of the core main body 10a. Note that each tooth 11 is a protrusion around which a stator coil 3 (see FIG. 2) is wound.

Each slot 12 is formed between adjacent teeth 11 and with an equal interval in the W direction. Also, the number of slots 12 formed and the number of teeth 11 are the same.

In the stator core 1A, a slot 12 of the core member 10A and a slot 12 of the core member 10B are stacked such that they are communicated in the Z direction. In addition, in the stator core 1A, a tooth 11 of the core member 10A and a tooth 11 of the core member 10B are stacked such that they overlap in the Z direction.

Figure 2:
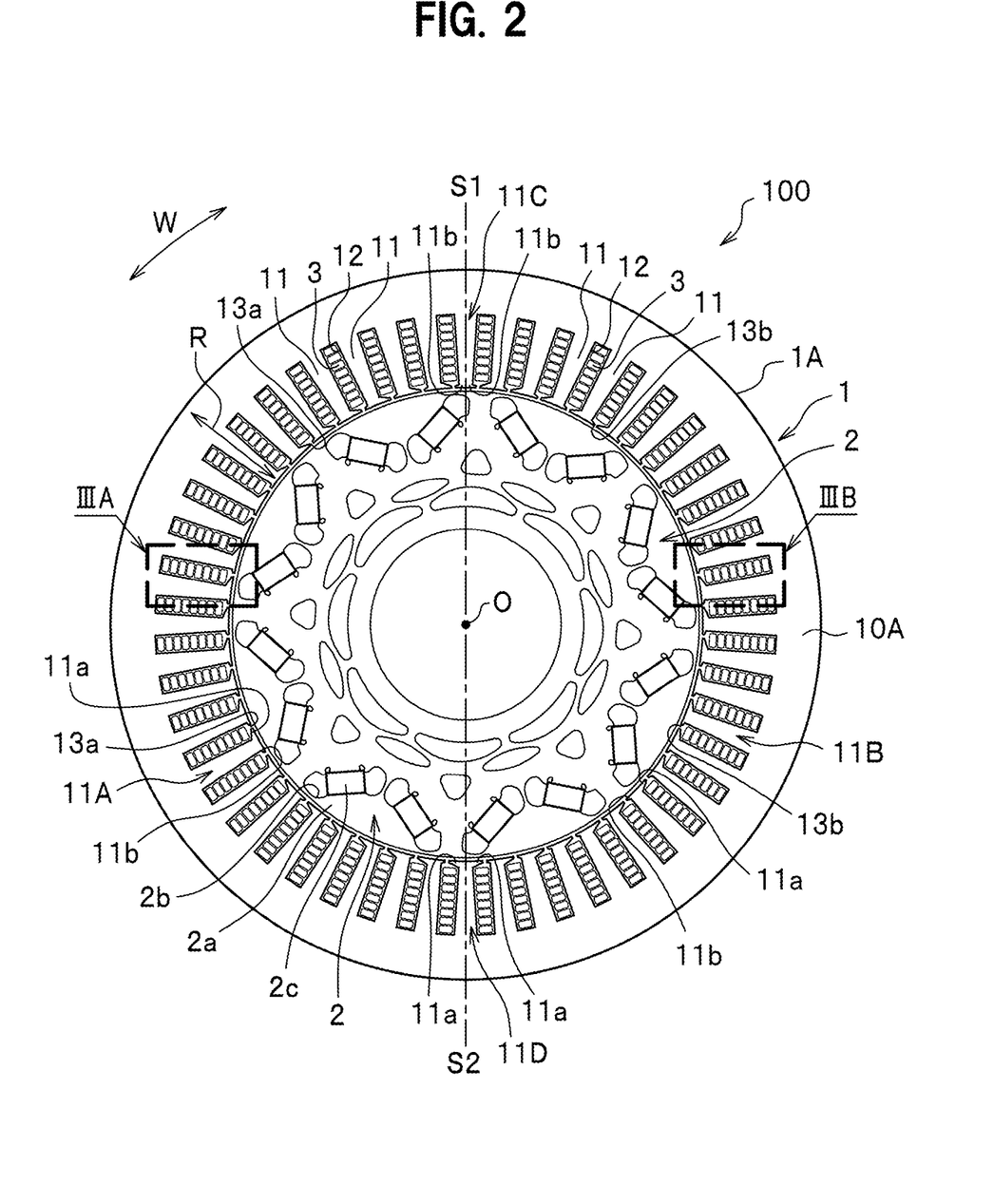
FIG. 2 is a front view illustrating a rotary electric machine having the stator core according to the first embodiment.

FIG. 2 is a front view illustrating a rotary electric machine having the stator core according to the first embodiment. Note that hereinbelow, an interior permanent magnet rotary electric machine (IPM motor) is exemplified. Here, FIG. 2 is a plane view of a state when viewed from the core member 10A side.

As shown in FIG. 2, a rotary electric machine 100 includes a stator 1 and a rotor 2. The stator 1 includes the stator core 1A and stator coils 3 (windings) provided in the stator core 1A. Each stator coil 3 is, for instance, a distributed winding and is wound and housed in each slot 12. The rotor 2 includes: a rotor core 2a fixed to a shaft (not shown); and a plurality of permanent magnets 2c provided in the rotor core 2a. A rotating magnetic field generated by the stator 1 drives rotation of the rotor 2.

The rotor core 2a is structured by, for instance, layering a plurality of annular magnetic steel sheets in the Z direction (see FIG. 1). In addition, an outer peripheral portion of the rotor core 2a is provided with slots (magnet-housing holes) 2b created throughout in the Z direction. These slots 2b are arranged along the W direction. Meanwhile, two of the slots 2b are paired and arranged like a V-shape such that a distance between their radially outer sides is wider.

Each slot 2b houses a permanent magnet 2c composed of a rare-earth element magnet, etc. The permanent magnet 2c is magnetized in the R direction. An outer peripheral portion of the rotor core 2a has a plurality of (in this embodiment, 8) magnetic pole sections. These magnetic pole sections are configured such that the magnetization direction is alternately reversed along the W direction.

In the stator core 1A, one magnetic pole section has six teeth 11. This embodiment has 8 magnetic pole sections and is thus provided with 48 teeth 11. Then, because the number of teeth 11 is 48, 48 slots 12 are provided.

In addition, as shown in the dashed-dotted line, the stator core 1A includes, every 180 degrees, a borderline area S1 or S2. These borderline areas S1 and S2 are disposed on a line crossing the center O in the R direction of each tooth 11. Further, in the stator core 1A, the left side and the right side of the borderline between the borderline areas S1 and S2 as shown in the figure have the same number of teeth 11 and slots 12.

As shown in FIG. 2, the core member 10A includes first teeth sections 11A and 11B and second teeth sections 11C and 11D.

The first teeth section 11A includes a plurality of teeth 11, each tooth 11 including, at a tip on the inner periphery side thereof, a first protrusion portion 11a and a second protrusion portion 11b with a lower protrusion height than the first protrusion portion 11a protruding in the W direction. Meanwhile, in the first teeth section 11A on one side (left side as shown in the figure) of the borderline between the borderline areas S1 and S2, the first protrusion portions 11a protrude in the clockwise direction and the second protrusion portions 11b protrude in the counter-clockwise direction.

The first teeth section 11B includes a plurality of teeth 11, each tooth 11 including, at a tip on the inner periphery side thereof, a first protrusion portion 11a and a second protrusion portion 11b with a lower protrusion height than the first protrusion portion 11a protruding in the W direction. Here, in the first teeth section 11B on the other side (right side as shown in the figure) of the borderline between the borderline areas S1 and S2, the first protrusion portions 11a protrude in the counter-clockwise direction and the second protrusion portions 11b protrude in the clockwise direction as shown in the figure.

The second teeth section 11C includes, at a tip on the inner periphery side of the core member 10A, a pair of the second protrusion portions 11b and 11b protruding in the W direction. In addition, the second teeth section 11C is positioned so as to overlap the borderline area S1.

The second teeth section 11D includes, at a tip on the inner periphery side of the core member 10A, a pair of the first protrusion portions 11a and 11a protruding in the W direction. In addition, the second teeth section 11D is positioned so as to overlap the borderline area S2.

Figure 3A:
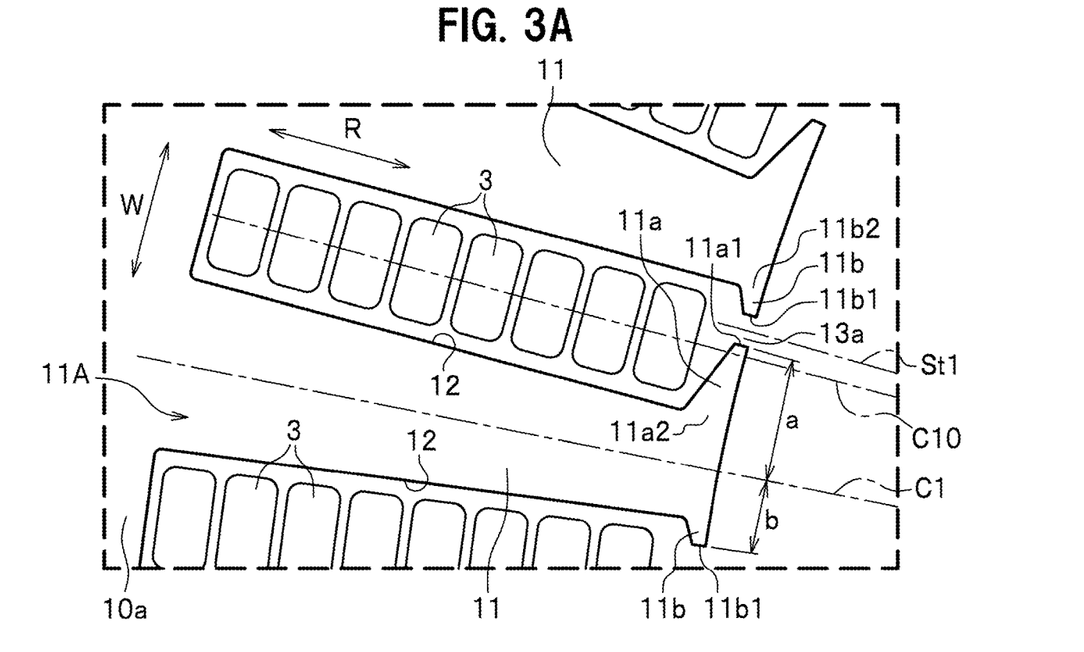
FIG. 3A is a magnified view of box IIIA in FIG. 2.
Figure 3B:
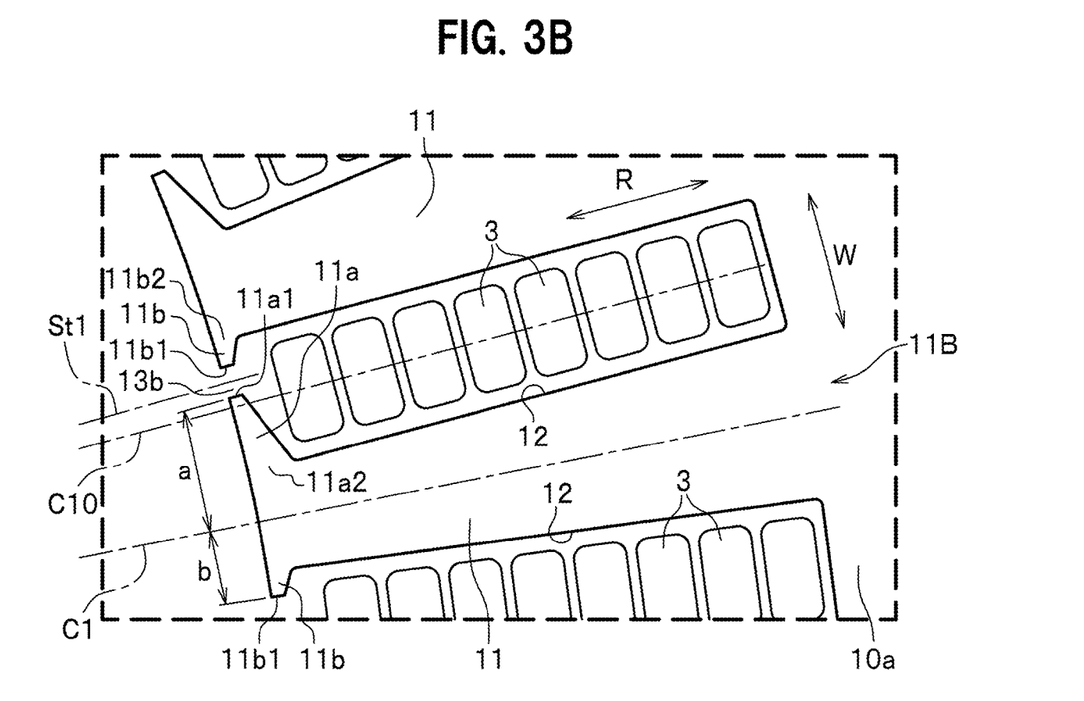
FIG. 3B is a magnified view of box IIIB in FIG. 2.

FIG. 3A is a magnified view of box IIIA in FIG. 2. FIG. 3B is a magnified view of box IIIB in FIG. 2.

As shown in FIG. 3A, each tooth 11 of the first teeth section 11A includes, at a tip on the inner periphery side of the tooth 11, the first protrusion portion 11a protruding in the W direction (in the clockwise direction of FIG. 2). In addition, each tooth 11 of the first teeth section 11A includes, at a tip on the inner periphery side of the tooth 11, the second protrusion portion 11b protruding in the direction opposite to the W direction of the first protrusion portion 11a (in the counter-clockwise direction of FIG. 2). Specifically, the protrusion height a of the first protrusion portion 11a is the length from the reference line C1, which crosses the center of each tooth 11 in the W direction and extends in the R direction, to a leading end 11a1 of the first protrusion portion 11a. In addition, the protrusion height b of the second protrusion portion 11b is the length from the reference line C1 to a leading end 11b1 of the second protrusion portion 11b. Then, the protrusion height a of the first protrusion portion 11a is longer than the protrusion height b of the second protrusion portion 11b. In this way, the first protrusion portion 11a and the second protrusion portion 11b are asymmetric (a>b).

In a plane view from the Z-direction side, each slot 12 formed between adjacent teeth 11 is elongated in the R direction and has an approximately rectangular shape. In addition, there is an opening portion 13a in communication with each slot 12 between adjacent teeth 11. This opening portion 13a is formed between a leading end 11a1 of the first protrusion portion 11a of one tooth 11 and a leading end 11b1 of the second protrusion portion 11b of another tooth 11, a slot 12 being interposed therebetween.

Further, the leading ends 11a1 and 11b1 are flat in the R direction and each have the same length in the R direction. Furthermore, a base 11a2 of each first protrusion portion 11a has a longer size in the R direction than a base 11b2 of the second protrusion portion 11b.

The center St1 of each opening portion 13a in a first region is deviated, in the W direction (in the clockwise direction), with respect to an axis C10 connecting the center (center of the shaft) O (see FIG. 2) of the stator core 1A (see FIG. 2) and the center of each slot 12 in the W direction.

As shown in FIG. 3B, each tooth 11 of the first teeth section 11B includes, at a tip on the inner periphery side of the tooth 11, the first protrusion portion 11a protruding in the W direction (in the counter-clockwise direction of FIG. 2). In addition, each tooth 11 of the first teeth section 11B includes, at a tip on the inner periphery side of the tooth 11, the second protrusion portion 11b protruding in the direction opposite to the W direction of the first protrusion portion 11a (in the clockwise direction of FIG. 2). Specifically, the protrusion height a of the first protrusion portion 11a is longer than the protrusion height b of the second protrusion portion 11b.

Figure 4:
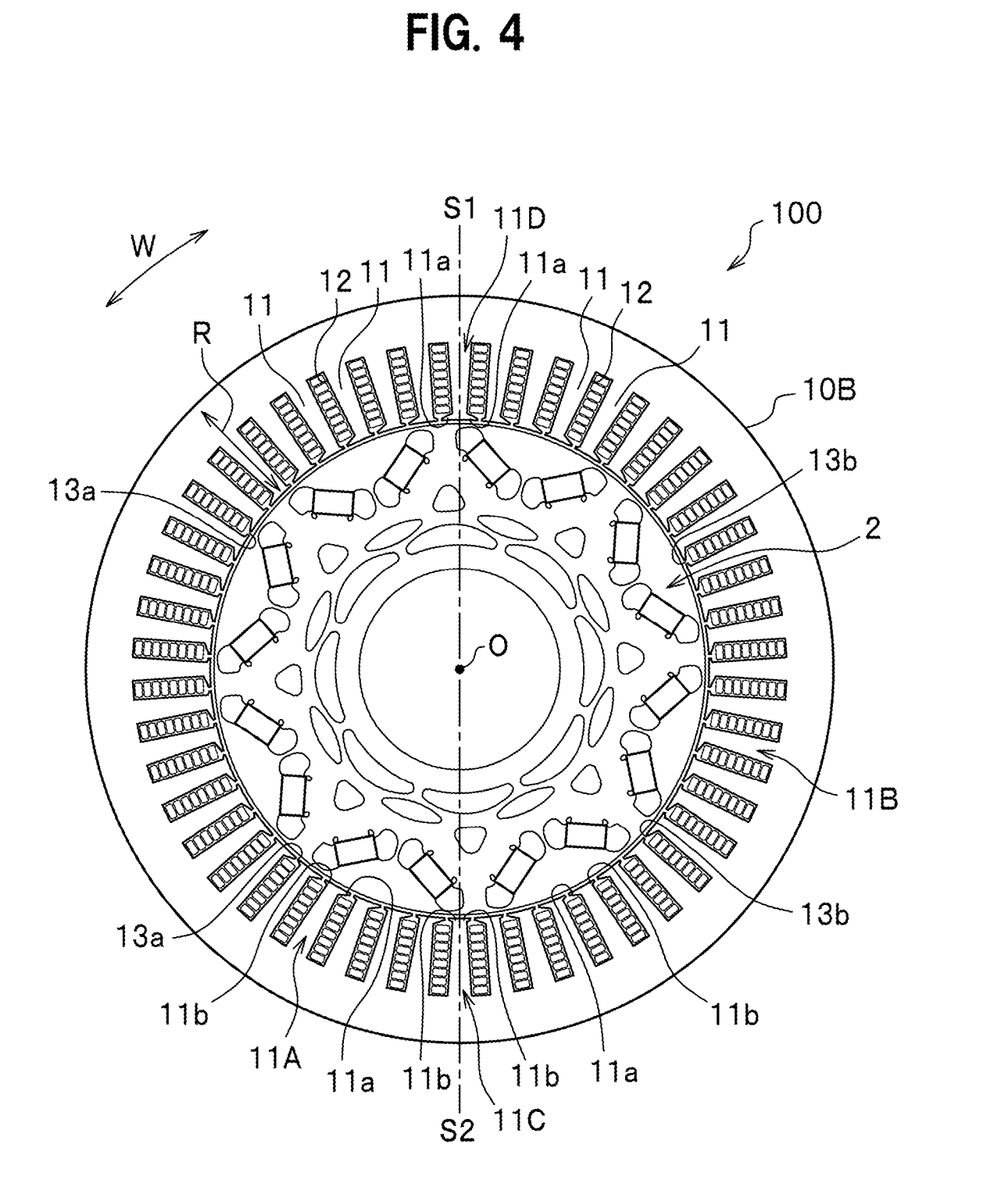
FIG. 4 is a front view illustrating another core member of the stator core according to the first embodiment.

FIG. 4 is a front view illustrating another core member of the stator core according to the first embodiment.

As shown in FIG. 4, the core member 10B includes the first teeth sections 11A and 11B and the second teeth sections 11C and 11D.

In the first teeth section 11A on one side (left side as shown in the figure) of the borderline between the borderline areas S1 and S2, the first protrusion portions 11a protrude in the counter-clockwise direction as shown in the figure and the second protrusion portions 11b protrude in the clockwise direction as shown in the figure.

In the first teeth section 11B on the other side (right side as shown in the figure) of the borderline between the borderline areas S1 and S2, the first protrusion portions 11a protrude in the clockwise direction as shown in the figure and the second protrusion portions 11b protrude in the counter-clockwise direction as shown in the figure.

The second teeth section 11C includes, at a tip on the inner periphery side of the core member 10B, a pair of the second protrusion portions 11b and 11b protruding in the W direction. The second teeth section 11C is positioned so as to overlap the borderline area S2.

The second teeth section 11D includes, at a tip on the inner periphery side of the core member 10B, a pair of the first protrusion portions 11a and 11a protruding in the W direction. The second teeth section 11D is positioned so as to overlap the borderline area S1.

In this way, the stator core 1A is structured by stacking, on the core member 10A, the core member 10A-shaped magnetic steel sheet(s) (magnetic sheet material(s)), which is turned upside down. Specifically, the core member 10B, which is turned upside down, is stacked on the core member 10A such that the second teeth section 11C and the second teeth section 11D are stacked in the Z direction (see FIG. 1).

Figure 5:
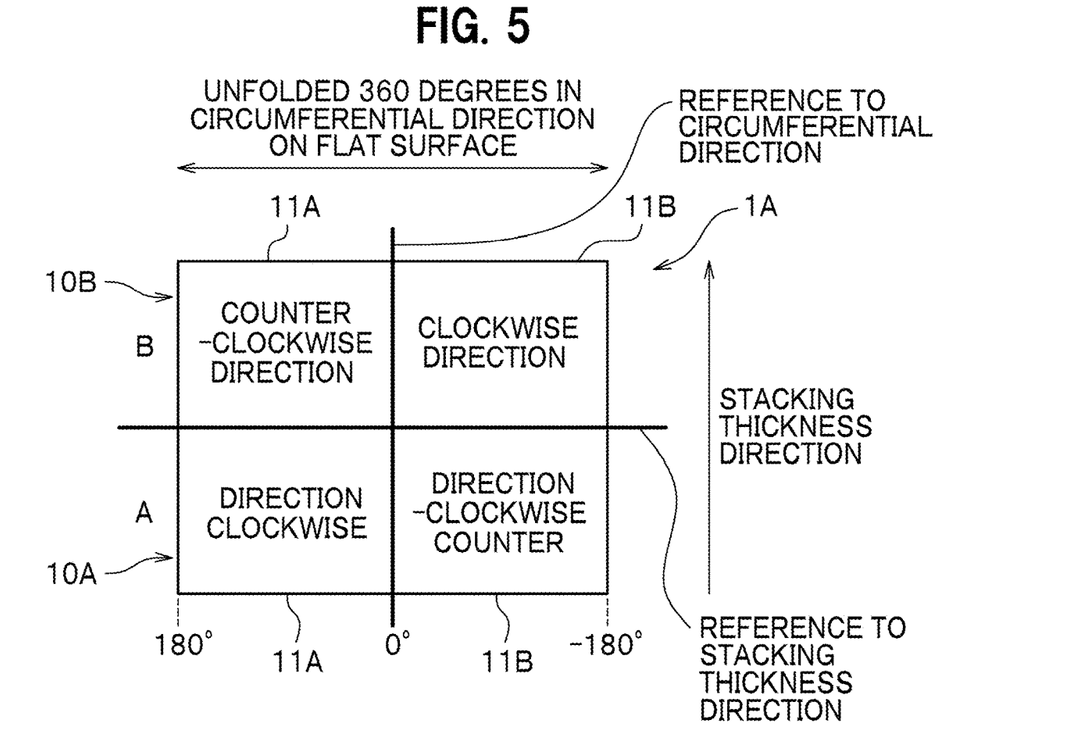
FIG. 5 is a diagram schematically illustrating how the stator core of FIG. 1 looks when unfolded.

FIG. 5 is a diagram schematically illustrating how the stator core of FIG. 1 looks when unfolded.

As shown in FIG. 5, in the stator core 1A when viewed with reference to the stacking thickness direction (with reference to the Z direction), the core member 10A as layer A (the first layer) is arranged below (on one side) as shown in the figure; and the core member 10B as layer B (the second layer) is arranged above (on the other side) as shown in the figure. Note that layer A and layer B are the core members 10A and 10B, which are each structured by layering a plurality of thin magnetic sheet materials.

Meanwhile, when the origin (0 degrees) of the circumferential direction is set in the core member 10A (layer A), longer teeth (the first protrusion portions 11a) are arranged between 0 to 180 degrees in the clockwise direction. Also, in the core member 10A (layer A), longer teeth (the first protrusion portions 11a) are arranged between 0 to −180 degrees in the counter-clockwise direction. By contrast, when the origin (0 degrees) of the circumferential direction is set in the core member 10B (layer B), longer teeth (the first protrusion portions 11a) are arranged between 0 to 180 degrees in the counter-clockwise direction. Also, in the core member 10B (layer B), longer teeth (the first protrusion portions 11a) are arranged between 0 to −180 degrees in the clockwise direction.

In this way, in the stator core 1A, the orientation of the first protrusion portions 11a is opposite every 180 degrees in the W direction (see FIG. 1). Thus, the opening portions 13a and 13b can be stacked while shifted in the W direction (i.e., can be skewed). As a result, the permeance distribution is leveled, so that torque ripple can be decreased. In addition, the stator core 1A is magnetically symmetrical with reference to the stacking thickness direction, so that thrust force is difficult to occur in the structure of the rotary electric machine 100.

Figure 6:
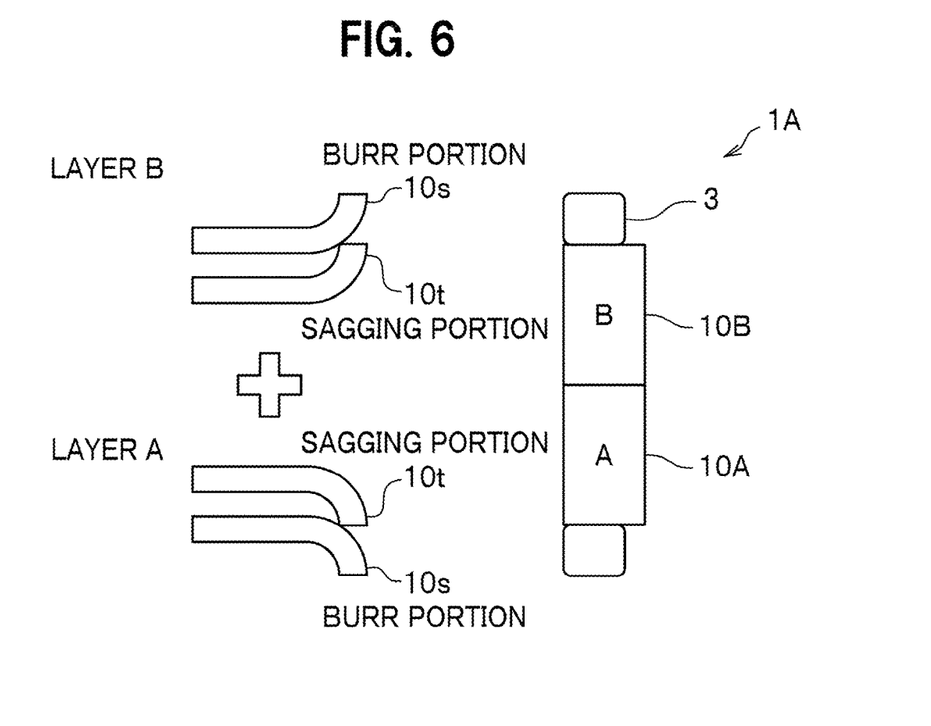
FIG. 6 is diagrams schematically illustrating a burr portion-sagging portion relationship in the stator core according to the first embodiment.

FIG. 6 is diagrams schematically illustrating a burr portion-sagging portion relationship in the stator core according to the first embodiment. Note that in FIG. 6, a burr portion and each sagging portion are simplified and then depicted.

Meanwhile, the core members 10A and 10B of the stator core 1A are configured such that a plurality of thin magnetic materials obtained by, for instance, punching thin steel sheets are layered in the Z direction. In such a punching process, edge portions of the magnetic sheet materials (magnetic steel sheets) cut include a burr portion 10s and a sagging portion(s) 10t. At that time, the burr portions may be arranged and face each other at the interface on which the core member 10A and the core member 10B are stacked. In this case, a gap between the core member 10A and the core member 10B occurs, thereby decreasing the space factor for the magnetic steel sheets (magnetic sheet materials) and thus decreasing the torque density.

Here, according to the first embodiment as shown in FIG. 6, in the core member 10A, the burr portion 10s and each sagging portion 10t are oriented downward as shown in the figure; and in the core member 10B, the burr portion 10s and each sagging portion 10t are oriented upward (the orientation is opposite to that of the core member 10A) as shown in the figure. In this way, the core members 10A and 10B are stacked such that the sagging portions 10t face each other. This can prevent the burr portions 10s from interfering with each other and can suppress a decrease in the space factor for the magnetic steel sheets (magnetic sheet materials).

As described above, the stator core 1A according to the first embodiment is produced by stacking the core members 10A and 10B formed annularly so as to surround the rotor 2, each core member including a plurality of slots 12 extending one end to another end in the Z direction and teeth 11 formed between the slots 12. The teeth 11 are included in the first teeth sections 11A and 11B including, at a tip on the inner periphery side of the core members 10A and 10B, each tooth including the first protrusion portion 11a and the second protrusion portion 11b with a lower protrusion height than the first protrusion portion 11a protruding in the W direction of the core members 10A and 10B. In addition, the teeth 11 are included in the second teeth section 11C having a pair of the first protrusion portions 11a and the second teeth section 11D having a pair of the second protrusion portions 11b. According to this configuration, a skew effect (torque ripple-reducing effect) can be exerted just by stacking identical magnetic steel sheets, one of which is turned upside down. Thus, substantially the same effect is exerted on a rotor skew and/or a stator skew while the production cost can be markedly reduced.

In addition, according to the first embodiment, the opening portions 13a and 13b are formed at the inner circumferential surface of the cores stacked (the core members 10A and 10B stacked) and are in communication with slots 12 between adjacent teeth 11. The center St1 of each of the opening portions 13a and 13b is deviated, in the W direction, with respect to the axis C10 connecting the center O of the core members 10A and 10B and the center (reference line) C1 of each slot 12 in the W direction. According to this configuration, the degree of asymmetry between the first protrusion portion 11a and the second protrusion portion 11b can be made larger. This makes it possible to enlarge the torque ripple-reducing effect.

In addition, according to the first embodiment, the cores stacked (the core members 10A and 10B stacked) are: layer A (the core member 10A) including one or more of the first teeth section 11A in which the first protrusion portions 11a are oriented toward one side in the W direction; and layer B (core member 10B) including one or more of the first teeth section 11B in which the first protrusion portions 11a are oriented toward the other side in the W direction. According to this configuration, a skew effect (torque ripple-reducing effect) can be exerted just by turning one of the core members 10A and 10B upside down. Providing just two layers of layer A and layer B makes it possible to prevent the burr portions 10s from facing each other, thereby reducing a cost increase accompanied by processing of the burr portions 10s.

Further, according to the first embodiment, the opening portions 13a and 13b are skewed by alternately stacking layer A and layer B while a plurality of slots 12 formed in the cores stacked (core members 10A and 10B stacked) are stacked in the Z direction of the core members 10A and 10B and are in communication. This allows for a skew effect by alternately stacking layer A and layer B.

Furthermore, according to the first embodiment, a plurality of slots 12 formed in the cores stacked (core members 10A and 10B stacked) are stacked in the Z direction and are in communication, the second teeth section has the same protrusion height in the circumferential direction and a counter circumferential direction (the first protrusion portions 11a, 11a/the second protrusion portions 11b and 11b). This can prevent the first protrusion portions 11a from interfering with one another.

Moreover, according to the first embodiment, the stacked core (the stacked core member 10A or 10B) is provided every 180 degrees with the borderline area S1 or S2; and the orientation of the first protrusion portions 11a or the second protrusion portions 11b in the W direction is opposite in the W direction with respect to the origin to which the borderline areas S1 and S2 are each set. This simple configuration makes it possible to exert a skew effect.

Besides, according to the first embodiment, the borderline areas S1 and S2 pass through and are provided with the second teeth sections 11C and 11D. This enables the opening portions 13a and 13b in addition to the second teeth sections 11C and 11D to be shifted (skewed) in the W direction along the entire circumference of the stator core 1A.

Second Embodiment

Figure 7:
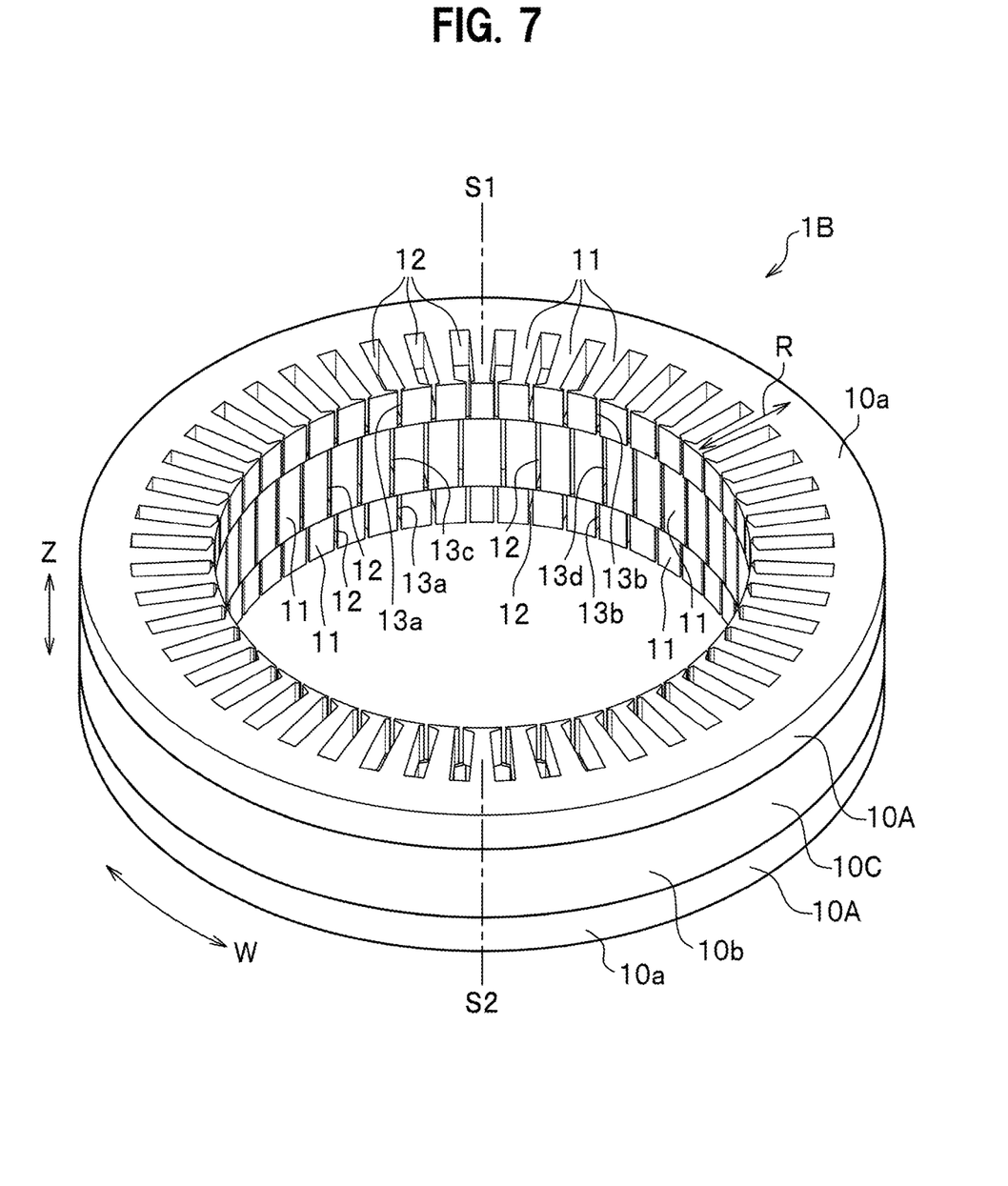
FIG. 7 is a perspective view illustrating a stator core according to a second embodiment.

FIG. 7 is a perspective view illustrating a stator core according to a second embodiment.

As shown in FIG. 7, the stator core 1B according to the second embodiment is structured by stacking the core member 10A (the first layer), a core member 10C (the second layer), and the core member 10A (the first layer) and has a substantially cylindrical shape. The core members 10A and 10C are each structured by, for instance, layering a plurality of magnetic steel sheets (magnetic sheet materials).

In addition, the length of the core member 10C in the Z direction is twice the length of the core member 10A. The core member 10C, the orientation of which is opposite to that of the core members 10A like the first embodiment, are stacked between the core members 10A.

In such a stator core 1B, in the core member 10A positioned below, the opening portions 13a and 13b are deviated in the W direction with respect to opening portions 13c and 13d of the core member 10C. Likewise, in the core member 10A positioned above, the opening portions 13a and 13b are deviated in the W direction with respect to the opening portions 13c and 13d of the core member 10C.

Figure 8:
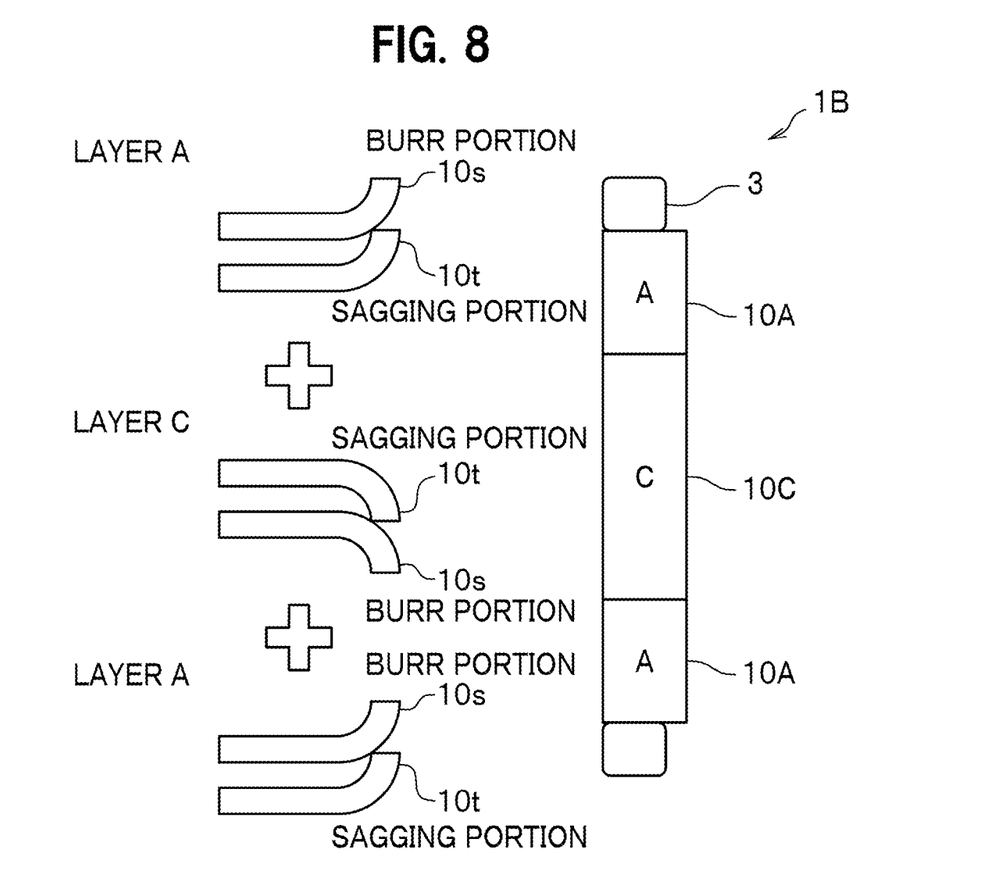
FIG. 8 is diagrams schematically illustrating a burr portion-sagging portion relationship in the stator core according to the second embodiment.

FIG. 8 is diagrams schematically illustrating a burr portion-sagging portion relationship in the stator core according to the second embodiment.

As shown in FIG. 8, in the stator core 1B, the burr portion 10s and each sagging portion 10t of the core member 10A positioned above are oriented upward as shown in the figure; and the burr portion 10s and each sagging portion 10t of the core member 10C are oriented downward as shown in the figure. In this case, the burr portion 10s and each sagging portion 10t of the core member 10A positioned below are oriented upward like those of the core member 10A positioned above as shown in the figure. Due to this configuration, the burr portion 10s of the core member 10A positioned below and the burr portion 10s of the core member 10C face each other.

In such a stator core 1B, in order to prevent the burr portions 10s from interfering with each other, the burr portions 10s should be leveled or the thickness of each bonded magnetic steel sheet (magnetic sheet material) layer should be thickened so as to carry out a process for avoiding the interference between the burr portions 10s. By contrast, according to the first embodiment, providing just two layers of layer A (core member 10A) and layer B (core member 10B) makes it possible to prevent the burr portions 10s from facing each other. This can avoid the above-described process, thereby reducing a cost increase.

Note that the present invention is not limited to the above embodiments and encompasses various modifications. For instance, in these embodiments, exemplified is the case where the second teeth sections 11C and 11D include a pair of the first protrusion portions 11a and a pair of the second protrusion portions 11b. However, only the pair of the first protrusion portions 11a may be included or only the pair of the second protrusion portions 11b may be included.

In addition, in these embodiments, exemplified is the case where the core members 10A, 10B, and 10C are each structured by layering a plurality of thin magnetic sheet materials. However, it may be possible to structure each core member by using one thick sheet material (including only one layer).

Reference Signs List

1 Stator
1A, 1B, 1C Stator core
2 Rotor
2a Rotor core
2b Slot
2c Permanent magnet
10A, 10B, 10C Core member
10a Core main body
10s Burr portion
10t Sagging portion
11 Tooth
11A, 11B First teeth section
11C, 11D Second teeth section
11a First protrusion portion
11b Second protrusion portion
12 Slot
13a, 13b Opening portion
13c, 13d Opening portion
100 Rotary electric machine
S1, S2 Borderline area

The invention claimed is:

1. A stator core for a rotary electric machine, comprising core members stacked and formed annularly so as to surround a rotor, each core member comprising a plurality of slots extending from one end to another end in a shaft direction and teeth formed between the slots, wherein a whole of the teeth includes a first teeth section comprising teeth successively arranged in a circumferential direction of each core member, and at a tip on an inner periphery side of each core member, each tooth of the first teeth section comprises a first protrusion portion and a second protrusion portion with a lower protrusion height than the first protrusion portion protruding in a circumferential direction of each core member, and a second teeth section comprising teeth, each tooth of the second teeth section comprising a pair of the first protrusion portions acid/or a pair of the second protrusion portions, wherein each of the core members comprises a plurality of punched thin steel sheets, each having a burr portion and a sagging portion and being layered in the shaft direction, and wherein first and second of the core members are stacked such that the burr portions of the first and second of the core members are arranged oppositely in the shaft directions.

2. The stator core for a rotary electric machine according to claim 1, wherein each stacked core member is provided every 180 degrees with a borderline area; and an orientation of the first protrusion portions or the second protrusion portions in the circumferential direction is opposite in the circumferential direction with respect to an origin to which the borderline area is set.

3. A rotary electric machine comprising the stator core for a rotary electric machine according to claim 1.

4. The stator core for a rotary electric machine according to claim 2, wherein the borderline area paths through and is provided with the second teeth section.

5. The stator core for a rotary electric machine according to claim 1, wherein the inner periphery of each core member is provided with opening portions in communication with the slots and between the adjacent teeth; and
a center of each of the opening portions in the circumferential direction is deviated, in the circumferential direction, with respect to an axis connecting a center of each core member and a center of each slot in the circumferential direction.

6. The stator core for a rotary electric machine according to claim 5, wherein the opening portions are stacked in the shaft direction in communication and the second teeth section has the same protrusion height in the circumferential direction and a counter-circumferential direction.

7. The stator core for a rotary electric machine according to claim 5, wherein the core members stacked are produced by including:
a first layer including one or more of the first teeth section in which the first protrusion portions are oriented toward one side in the circumferential direction; and
a second layer including one or more of the first teeth section in which the first protrusion portions are oriented toward the other side in the circumferential direction.

8. The stator core for a rotary electric machine according to claim 7, wherein the opening portions are skewed by alternately stacking the first layer and the second layer while a plurality of the slots formed in the core members stacked are stacked in the shaft direction of the core members and are in communication.

* * * * *